(12) United States Patent
Tripp et al.

(10) Patent No.: US 10,838,915 B2
(45) Date of Patent: Nov. 17, 2020

(54) DATA-CENTRIC APPROACH TO ANALYSIS

(71) Applicant: International Business Machines Corporation, Armonk, NY (US)

(72) Inventors: Omer Tripp, Bronx, NY (US); Pietro Ferrara, White Plains, NY (US); David Lubensky, Brookfield, CT (US); Marco Pistoia, Amawalk, NY (US)

(73) Assignee: International Business Machines Corporation, Armonk, NY (US)

( * ) Notice: Subject to any disclaimer, the term of this patent is extended or adjusted under 35 U.S.C. 154(b) by 222 days.

(21) Appl. No.: 16/123,574

(22) Filed: Sep. 6, 2018

(65) Prior Publication Data

US 2020/0081995 A1    Mar. 12, 2020

(51) Int. Cl.
| | |
|---|---|
| *G06F 16/13* | (2019.01) |
| *G06F 16/25* | (2019.01) |
| *G06F 16/11* | (2019.01) |
| *G06F 21/60* | (2013.01) |
| *G06F 21/62* | (2013.01) |

(52) U.S. Cl.
CPC ............ *G06F 16/13* (2019.01); *G06F 16/122* (2019.01); *G06F 16/258* (2019.01); *G06F 21/604* (2013.01); *G06F 21/6218* (2013.01); *G06F 2221/2141* (2013.01)

(58) Field of Classification Search
CPC ...... G06F 16/13; G06F 16/122; G06F 16/258; G06F 21/604; G06F 21/6218; G06F 2221/2141; G06F 16/10
USPC ......................................................... 707/769
See application file for complete search history.

(56) References Cited

U.S. PATENT DOCUMENTS

| | | | |
|---|---|---|---|
| 6,581,093 B1 * | 6/2003 | Verma ..................... | G06F 21/64 709/217 |
| 7,065,742 B1 * | 6/2006 | Bogdan .................. | G06F 9/4492 717/106 |
| 7,158,990 B1 * | 1/2007 | Guo ....................... | G06F 40/149 |

(Continued)

OTHER PUBLICATIONS

Little M., "Data-Centric Security: Protecting What really Matters", Infosecurity Magazine Home, dated Sep. 21, 2017, 3 pages, accessed online at < https://www.infosecurity-magazine.com/opinions/data-centric-security-protecting/> (Year: 2017).*

(Continued)

*Primary Examiner* — Phuong Thao Cao
(74) *Attorney, Agent, or Firm* — Scully, Scott, Murphy & Presser, P.C.; Daniel Morris, Esq.

(57) ABSTRACT

A method, system and computer readable program are disclosed for managing data in a computing network. In an embodiment, the invention provides a method comprising obtaining specified data from a database in the computing network, aggregating the specified data in a defined data structure stored in the computing network, and specifying in the data structure properties over the data aggregated in the data structure. In an embodiment, a plurality of services in the computing network use the data in the data structure in accordance with the properties specified in the data structure. In an embodiment, one or more of the services modifies one or more of the properties specified in the data structure based on a transformation by the one or more of the services of the data aggregated in the data structure.

16 Claims, 9 Drawing Sheets

(56) References Cited

U.S. PATENT DOCUMENTS

| | | | | |
|---|---|---|---|---|
| 7,281,241 | B2* | 10/2007 | Benoudiz | G06F 11/3664 714/E11.217 |
| 7,386,565 | B1* | 6/2008 | Singh | G06F 16/24556 |
| 7,496,670 | B1* | 2/2009 | Givoly | G06Q 30/02 705/51 |
| 7,562,232 | B2* | 7/2009 | Zuili | G06F 21/6209 713/193 |
| 7,882,122 | B2 | 2/2011 | Wong | |
| 7,885,942 | B2* | 2/2011 | Chand | G06Q 30/02 707/688 |
| 7,890,530 | B2* | 2/2011 | Bilger | G06F 21/6227 707/781 |
| 8,175,969 | B2* | 5/2012 | Yang | G06Q 20/102 705/40 |
| 8,191,042 | B2* | 5/2012 | Pinto | G06F 9/4488 717/117 |
| 8,620,959 | B1* | 12/2013 | Denton, III | G06F 16/25 707/796 |
| 8,694,540 | B1* | 4/2014 | Lin | G06F 16/211 707/777 |
| 8,903,889 | B2 | 12/2014 | Vijaykumar et al. | |
| 8,971,504 | B2 | 3/2015 | Mousseau et al. | |
| 9,734,157 | B1* | 8/2017 | Brahma Raju | G06F 3/06 |
| 10,007,682 | B2* | 6/2018 | Black | G06F 16/283 |
| 10,404,757 | B1* | 9/2019 | Horton | H04L 63/10 |
| 10,489,391 | B1* | 11/2019 | Tomlin | G06F 16/285 |
| 2002/0059260 | A1* | 5/2002 | Jas | G06F 16/2365 |
| 2004/0215629 | A1* | 10/2004 | Dettinger | G06F 16/2452 |
| 2004/0249836 | A1* | 12/2004 | Reynders | G16H 10/20 |
| 2005/0125387 | A1* | 6/2005 | Fish | G06F 16/907 |
| 2005/0155037 | A1* | 7/2005 | Klein | G06F 9/465 719/310 |
| 2005/0262115 | A1* | 11/2005 | Hu | G06F 40/226 |
| 2009/0070693 | A1* | 3/2009 | Mosquera | G06F 40/117 715/764 |
| 2010/0023577 | A1* | 1/2010 | Vijaykumar | G06F 9/4868 709/202 |
| 2010/0064377 | A1* | 3/2010 | Farrell | G06F 21/6245 726/28 |
| 2011/0022733 | A1* | 1/2011 | Karaoguz | H04L 67/303 709/247 |
| 2011/0224953 | A1* | 9/2011 | Webster | G06Q 10/10 703/1 |
| 2011/0265162 | A1* | 10/2011 | Alavandar | G06F 21/577 726/7 |
| 2011/0313979 | A1* | 12/2011 | Roberts | G06F 16/24565 707/690 |
| 2012/0198323 | A1* | 8/2012 | Lier | G06F 9/451 715/226 |
| 2012/0210432 | A1* | 8/2012 | Pistoia | G06F 11/3604 726/25 |
| 2012/0246150 | A1* | 9/2012 | Comi | G06F 16/21 707/722 |
| 2012/0250865 | A1* | 10/2012 | Terpstra | H04L 63/062 380/279 |
| 2013/0138681 | A1* | 5/2013 | Abrams | G06F 16/256 707/769 |
| 2013/0339385 | A1* | 12/2013 | Abrams | G06F 16/256 707/770 |
| 2014/0149288 | A1* | 5/2014 | Martini | G06Q 40/02 705/44 |
| 2014/0214828 | A1* | 7/2014 | Buco | G06F 16/2282 707/736 |
| 2014/0250166 | A1* | 9/2014 | Desai | G06Q 30/02 709/203 |
| 2014/0279876 | A1* | 9/2014 | Prasanna | G06F 16/254 707/610 |
| 2014/0279910 | A1* | 9/2014 | Prasanna | G06F 16/258 707/639 |
| 2015/0248357 | A1* | 9/2015 | Kaplan | G06F 9/45558 713/193 |
| 2015/0261791 | A1* | 9/2015 | Berry | G06F 16/27 707/802 |
| 2016/0072805 | A1* | 3/2016 | Freudiger | H04L 63/0428 713/159 |
| 2016/0299916 | A1* | 10/2016 | Prasanna | G06F 16/2365 |
| 2017/0169065 | A1* | 6/2017 | Darcy | G06F 3/0481 |
| 2017/0270163 | A1* | 9/2017 | Christoph | G06F 16/2282 |
| 2018/0032635 | A1* | 2/2018 | Greenberg | G06F 16/838 |
| 2018/0034857 | A1* | 2/2018 | Ferrara | H04L 63/20 |
| 2018/0081905 | A1* | 3/2018 | Kamath | G06F 16/248 |
| 2018/0173606 | A1* | 6/2018 | Malla | G06F 11/3688 |
| 2019/0156302 | A1* | 5/2019 | Tonio | G06Q 20/047 |

OTHER PUBLICATIONS

Tripp et al., "TAJ: Effective Taint Analysis of Web Applications", PLDI '09, Jun. 15-20, 2009, Dublin, Ireland, 11 pages.

Fink et al., "Effective Typestate Verification in the Presence of Aliasing", ISSTA '06, Jul. 17-20, 2006, Portland, Maine, USA, 12 pages.

"Object-Oriented Software Construction", Wikipedia, https://en.wiki/Object-Oriented_Software_Construction, last edited Feb. 28, 2018, pp. 1-3.

* cited by examiner

DATA-CENTRIC APPROACH TO ANALYSIS

BACKGROUND

This invention generally relates to data management, and more specifically, to using a data-centric approach to manage data. Embodiments of the invention aggregate data into data structures and specify and ensure properties over the data.

The space of mobile, cloud, and mobile/cloud architectures is rapidly evolving. Together with the impressive technological breakthroughs, there are also significant challenges. One of the main challenges in this dynamic ecosystem of mobile devices and applications is how to enforce security and integrity policies over the data accessed by the different applications, where in today's reality, data is becoming a more valuable and persistent asset than the code of the program.

The traditional approach to analysis of software systems is to place the program at the center, and treat the program as an input/output transformer that operates on transient input data. Enforcement of properties over data then amounts to rough abstractions applied to raw data elements, where the state of the data is approximated and monitored in terms of the program's flow and statements.

SUMMARY

Embodiments of the invention provide a method, system and computer readable program for managing data in a computing network. In an embodiment, the invention provides a method comprising obtaining specified data from a database in the computing network, aggregating the specified data in a defined data structure stored in the computing network, and specifying in the data structure properties over the data aggregated in the data structure. In an embodiment, a plurality of services in the computing network use the data in the data structure in accordance with the properties specified in the data structure. In an embodiment, one or more of the services modifies one or more of the properties specified in the data structure based on a transformation by the one or more of the services of the data in the data structure.

Embodiments of the invention bring data to the front, treating mobile software from a data-centric viewpoint. In this perspective, raw data is no longer treated as such, but instead the user can attach properties—such as consistency, integrity, security and provenance—directly to the data itself. Then, for instance, data can be specified as classified with respect to any application that may access the data, and the flow of data between composed data services can be automatically verified as correct in a modular fashion.

This endows the user with the ability to manage their mobile data by specifying and ensuring properties over the data itself. The code manipulating the data is shifted to the background and data are now at the foreground. Relevant properties become more manageable and enforceable.

DETAILED DESCRIPTION

Figure 1:
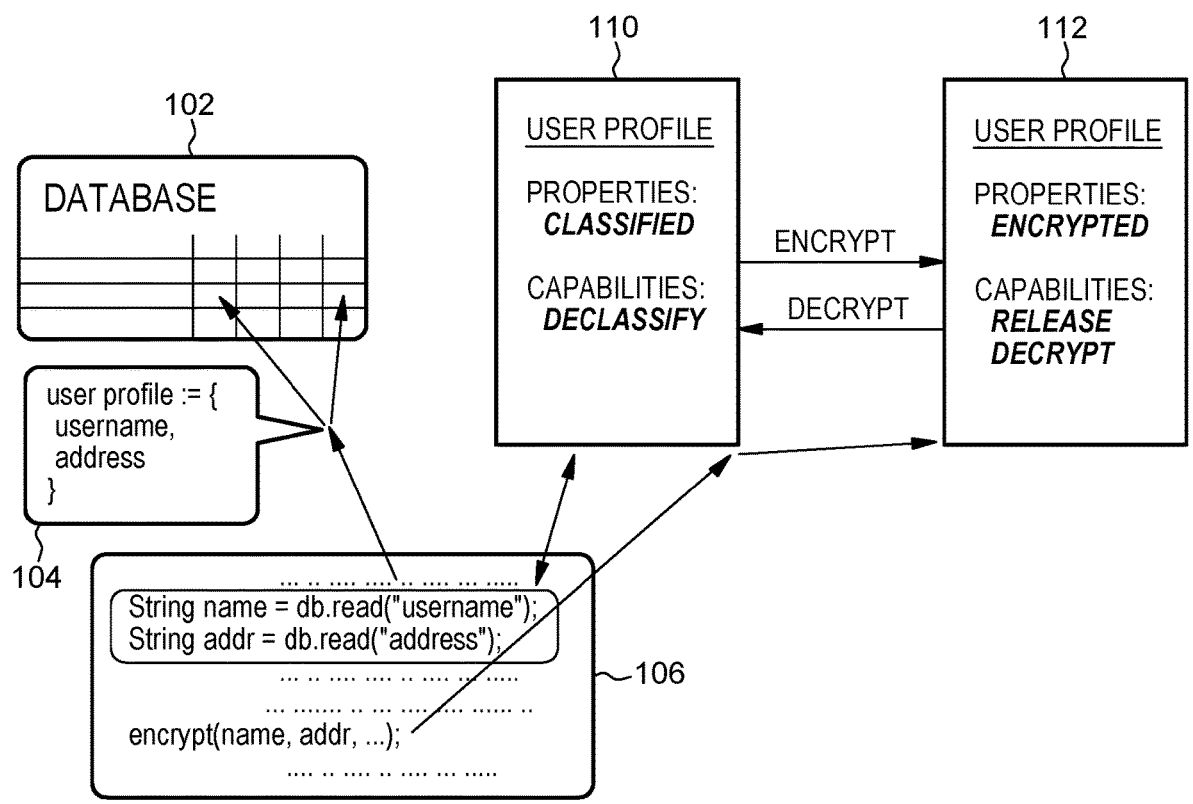
FIG. 1 illustrates aggregating raw data into data structures in accordance with an embodiment of the invention.

As mentioned above, the space of mobile, cloud, and mobile/cloud architectures is rapidly evolving. Together with the impressive technological breakthroughs, there are also significant challenges. One of the main challenges in this dynamic ecosystem of mobile devices and applications is how to enforce security and integrity policies over the data accessed by the different applications, where in today's reality, data is becoming a more valuable and persistent asset than the code of the program.

The traditional approach to analysis of software systems is to place the program at the center, and treat the program as an input/output transformer that operates on transient input data. Enforcement of properties over data then amounts to rough abstractions applied to raw data elements, where the state of the data is approximated and monitored in terms of the program's flow and statements.

An example of this—and perhaps the most prevalent and practically useful form of program analysis—is taint analysis, where data coming from the outside is marked with a taint tag. This lets the analysis check whether user-provided data may flow into security-relevant operations.

This coarse form of data representation is, however, insufficient when it comes to mobile systems. Mobile and cloud computing systems aggregate data from multiple sources, including physical sensors, social networks and external public databases. These data sources facilitate the creation and modification of data on mobile devices, and enable communications with legacy systems of records. Ensuring the consistency, security and integrity of mobile data remains a manual, burdensome and error-prone process.

As an illustration, it is hard to verify whether private or confidential data has been properly obfuscated by all the mobile applications accessing the data. The only existing approach is to verify that each and every application accessing the data is taking sufficient measures to obfuscate the data before releasing the data to external observers, which is a nontrivial as well as inherently non-modular solution. A different approach would be to place secrecy constraints directly on the data itself.

Another example is data services, which recently emerged as an architectural solution for top-down design of mobile software. In this design, an app is structured as a composition of such services, and the challenge then is to ensure that the output from one data service is interpreted correctly by a downstream data service. This is currently done manually, by the developer, and requires subtle reasoning as well as significant resource investment. Verifying the correctness of data-service compositions automatically could dramatically improve the productivity of developers, as well as the robustness of their apps.

Embodiments of the invention specify properties over data, and verify the integrity and well being of data. To specify properties over data, embodiments of the invention use a formal declarative language for aggregation and abstraction of raw data records as unified data structures with properties and capabilities. As an example, different records pertaining to the personal profile of a mobile-device user—such as the user's address, contacts, phone number, birth date and preferences—can be combined into a data structure, where different fields can be annotated differently (e.g., marking birth date as public and phone number as secret), and consistency constraints can be applied to sets of fields (e.g., enforcing a correlation between the user's zip code and street address). In one embodiment, the design of the declarative language can follow the principles of the object-oriented programming (OOP) paradigm. These include encapsulation, subclassing, pre and post conditions, and modular design of specifications.

Imposing structure on data such that assertions can be placed over the data, and the transformations applied to the data, yields a model that resembles an object. This objectification of raw data involves assignment of properties and capabilities to the resulting data structures.

FIG. 1 shows an example of aggregating raw data into data structures and assigning properties and capabilities to the resulting data structures. FIG. 1 shows a database 102, a user profile 104, a program 106, and structures 110 and 112 formed from the data in the user profile.

As an example, given in FIG. 1, the data grouped into a user profile 104 can initially be annotated, in data structure 110, as classified and carry a declassification capability. Once the program declassifies the data, as in the data structure 112, then the program's 106 dynamic state (or typestate) changes, and the data's capabilities now include e.g. release. Updates to the data are identified and accounted for by linking between the specification over the data and the operations performed by the program.

As an example, an application domain for embodiments of the invention is dynamic monitoring. The runtime system is augmented to monitor data access according to the specification (i.e., viewing data at the object level). This monitoring ensures that data are kept in an admissible state all through the execution of the system (e.g., that the application does not mutate only one field belonging in a set of correlated fields), and that the application responds immediately to violations.

Static analysis can be applied to facilitate specification effort via inference. Through semantic modeling of the code, the analysis can propose useful properties and capabilities, as well as hint toward potential optimizations (e.g., that the runtime system need not track a given property if this property is known not to be affected by the code).

Embodiments of the invention provide critical support for data management. Among other advantages, the capabilities described herein support mobile middleware and application-level solutions. These capabilities—given the increasingly prominent role of data in the mobile landscape—may be used to provide significant improvements in terms of productivity, security and robustness of mobile software, and facilitate important data services.

Figure 2:
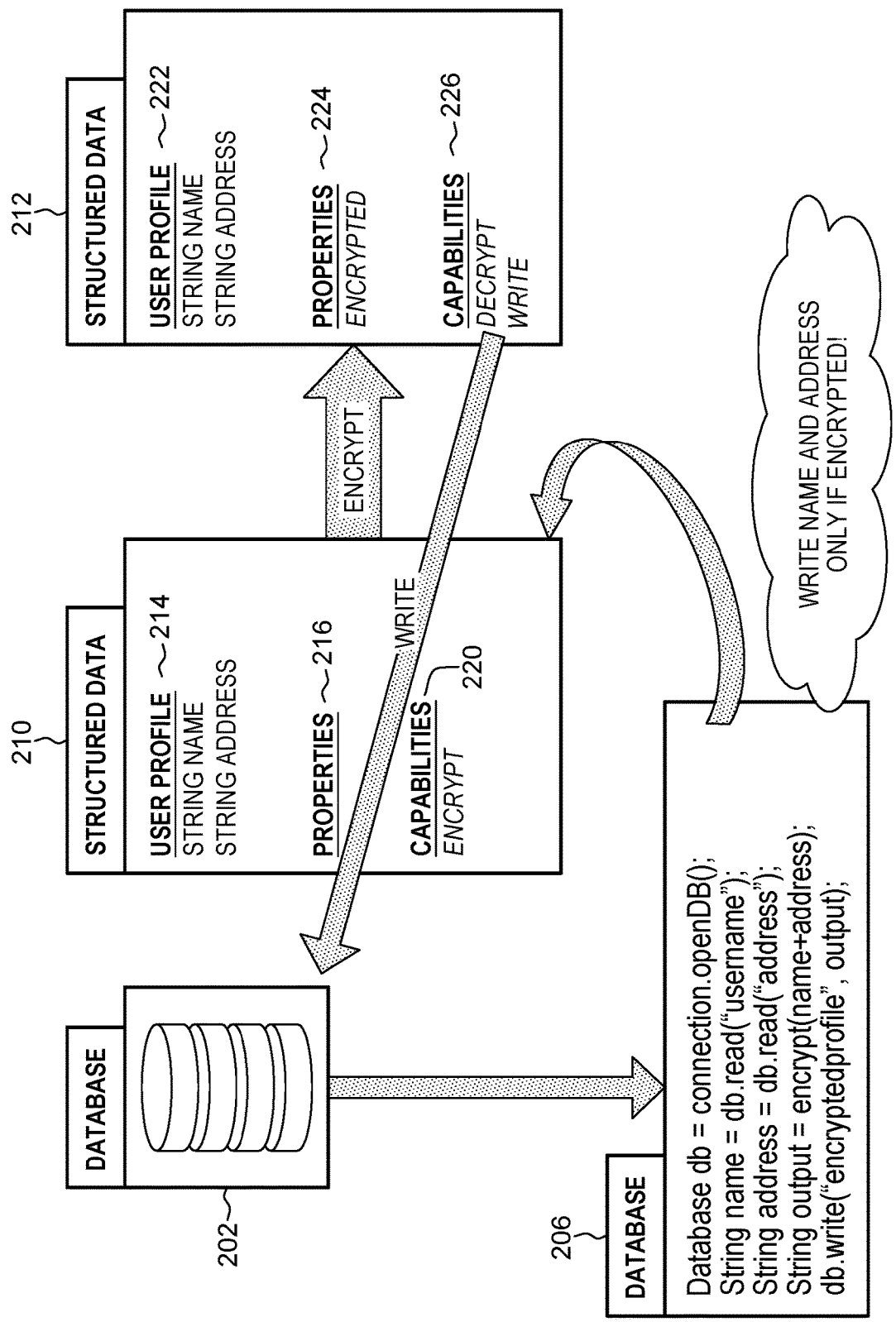
FIG. 2 illustrates a database and structured data.

FIG. 2 illustrates an example of a current procedure for aggregating data from a database. FIG. 2 shows a database 202, a program 206, and structures 210 and 212 formed from data in the database. Data structure 210 includes a user profile 214, and identifies properties 216 and capabilities 220 of the data in that user profile. In structure 210, the user profile 222 has the property that it is unencrypted, and the data has the capability of being encrypted. Data structure 212 also includes a user profile 222, and identifies properties 224 and capabilities 226 of the data in the user profile. In data structure 212, the user profile 222 has the property that it is encrypted, and the data has the capabilities of being decrypted and written. With the program 206 shown in FIG. 2, the program will write the name and address from the user profile only if they are encrypted.

Figure 3:
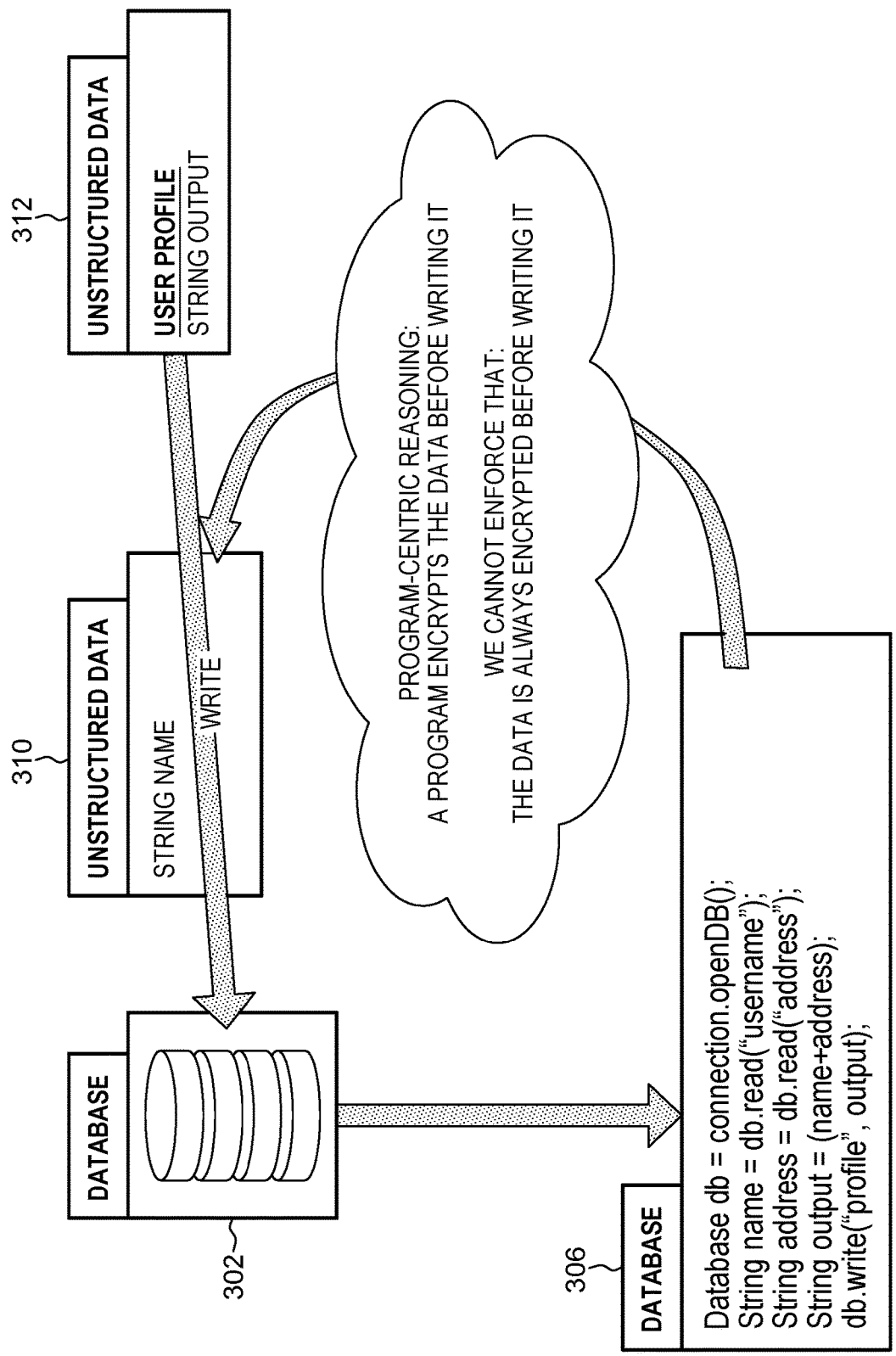
FIG. 3 shows unstructured data used in current mobile systems.

FIG. 3 shows a procedure for using data with current mobile systems. FIG. 3 shows a database 302, a program 306, unstructured data 310, and unstructured data 312. As illustrated in FIG. 3, current mobile systems use program-centric reasoning: a program encrypts the data before writing the data. Current mobile systems cannot enforce a rule that the data is always encrypted before writing the data.

Figure 4:
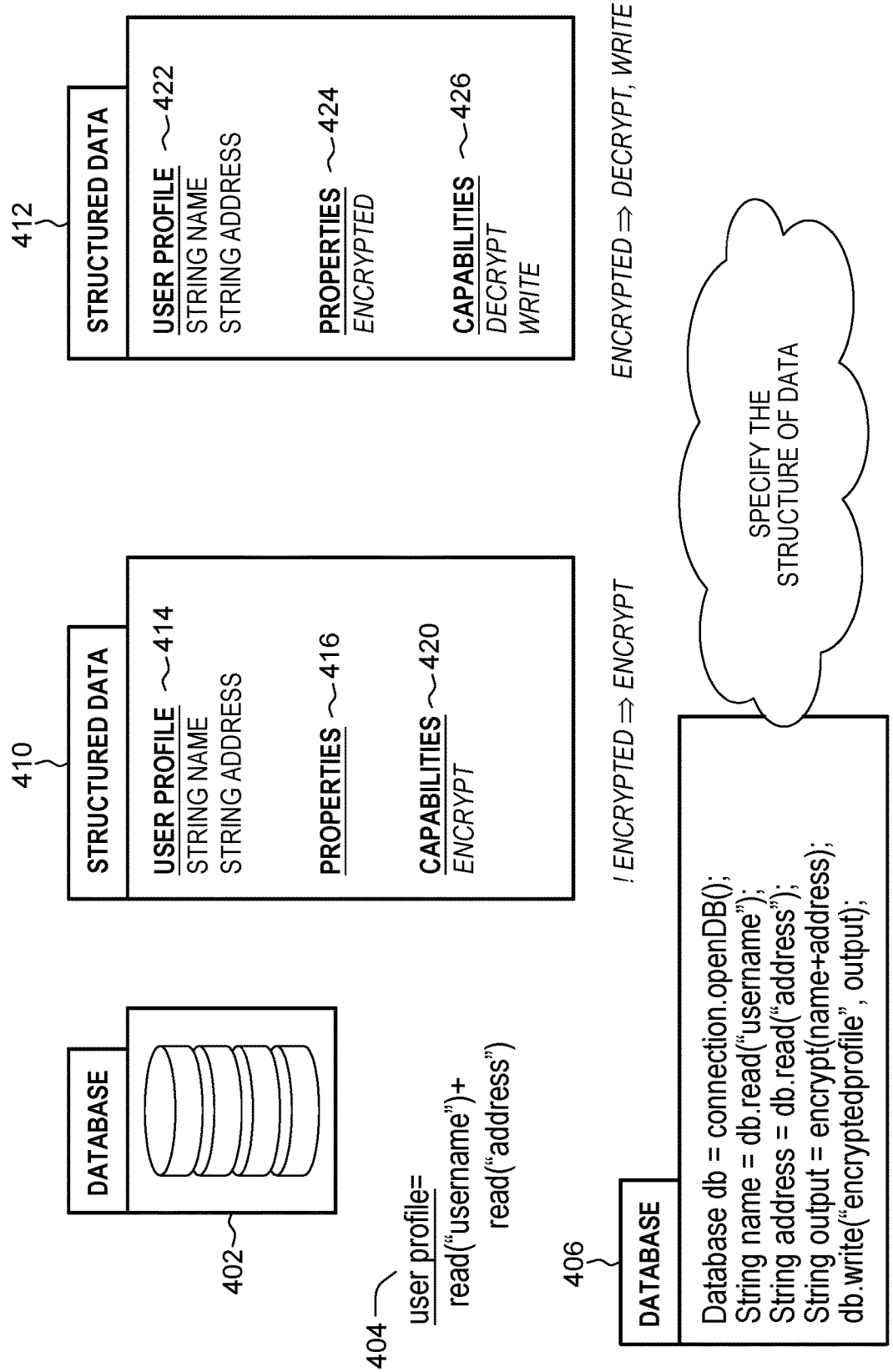
FIG. 4 illustrates structured data in accordance with an embodiment of the invention.

FIG. 4 illustrates the structure of an embodiment of the present invention. FIG. 4 shows a database 402, a user profile 404, a program 406, and structures 410 and 412 formed from data in the database. Data structure 410 includes a user profile 414, and identifies properties 416 and capabilities 420 of that data. In this structure, the user profile is unencrypted, and the data has the capability of being encrypted. Data structure 412 also includes a user profile 422, and identifies properties 424 and capabilities 426 of the data in this user profile. In data structure 412, the user profile has the property that it is encrypted, and the data has the capability of being decrypted and of being written from the data structure. The program 402 of FIG. 4 specifies the structure of data.

Figure 5:
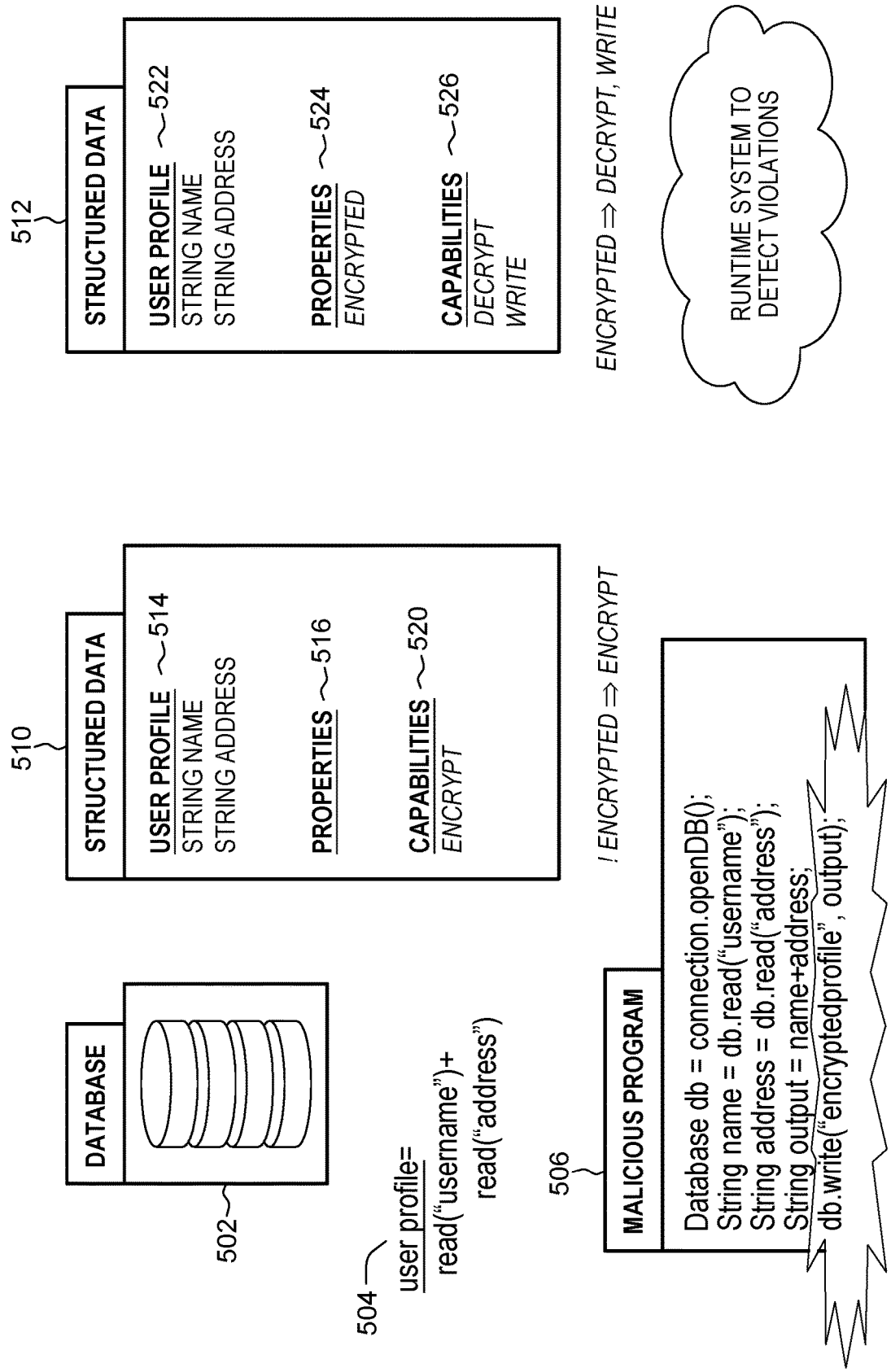
FIG. 5 is a further illustration of structured data in accordance with an embodiment of the invention.

FIG. 5 illustrates additional aspects of embodiments of the invention. FIG. 5 shows database 502, a user profile 504, program 506, and data structures 510 and 512. Data structure 510 includes a user profile 514, and identifies properties 516 and capabilities 520 of that data. In this structure, the user profile is unencrypted, and the data has the capability of being encrypted. Data structure 512 includes a user profile 522, and identifies properties 524 and capabilities 526 of the data in this user profile. In data structure 512, the user profile is encrypted, and the data has the capability of being decrypted and of being written from the data structure. With the example shown in FIG. 5, program 506 is a malicious program, and a runtime system detects violations.

Figure 6:
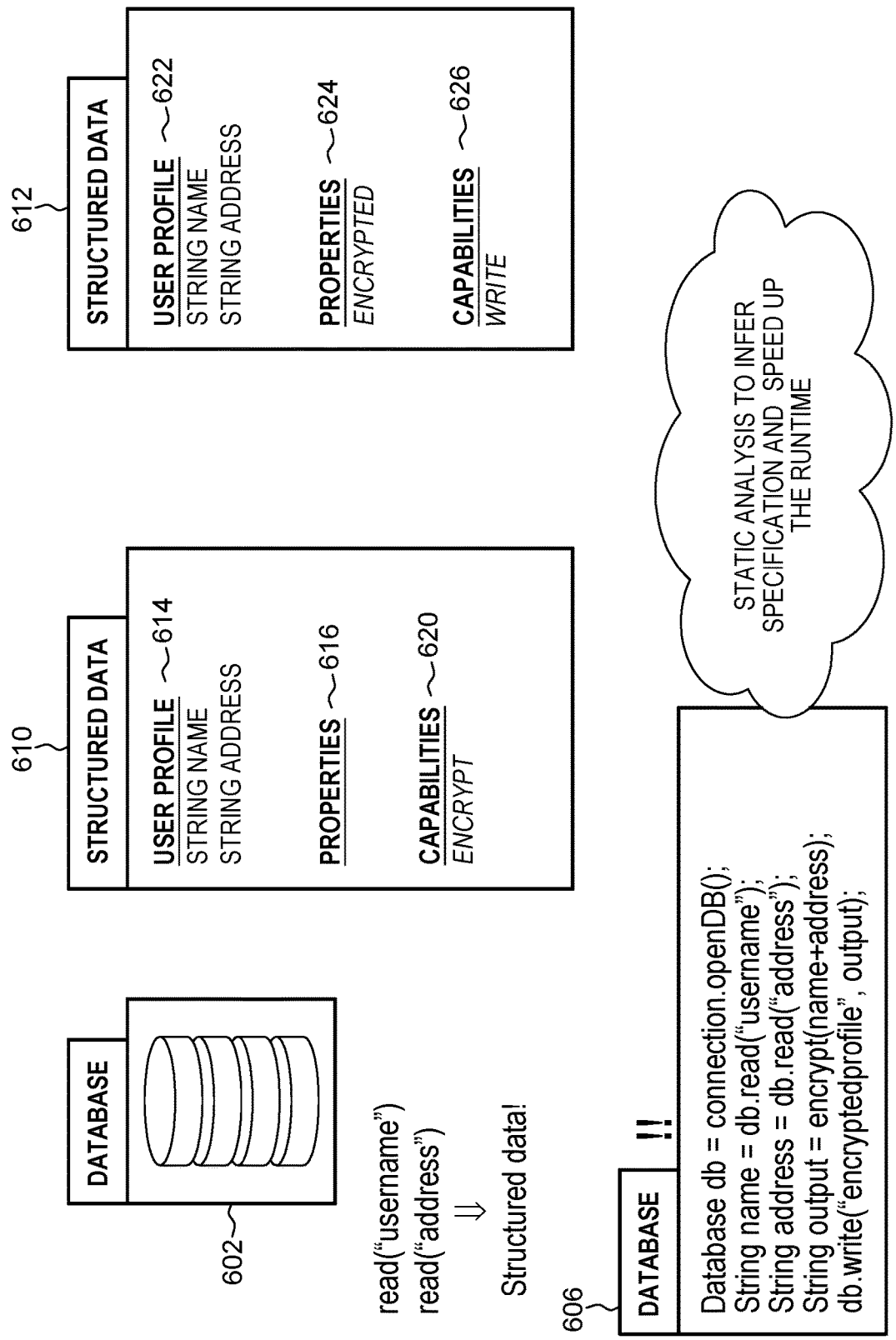
FIG. 6 illustrates additional aspects of structured data in accordance with an embodiment of the invention.

FIG. 6 shows additional aspects of embodiments of the invention. FIG. 6 shows database 602, program 606, and data structures 610 and 612. Data structure 610 includes a user profile 614, and identifies properties 616 and capabilities 620 of that data. In this structure, the user profile is unencrypted, and the data has the capability of being encrypted. Data structure 612 includes a user profile 622, and identifies properties 624 and capabilities 626 of the data in this user profile. In data structure 612, the user profile 622 is encrypted, and the data has the capability of being decrypted and of being written from the data structure. With the example shown in FIG. 6, a static analysis is used to infer specification and speed up the runtime.

Figure 7:
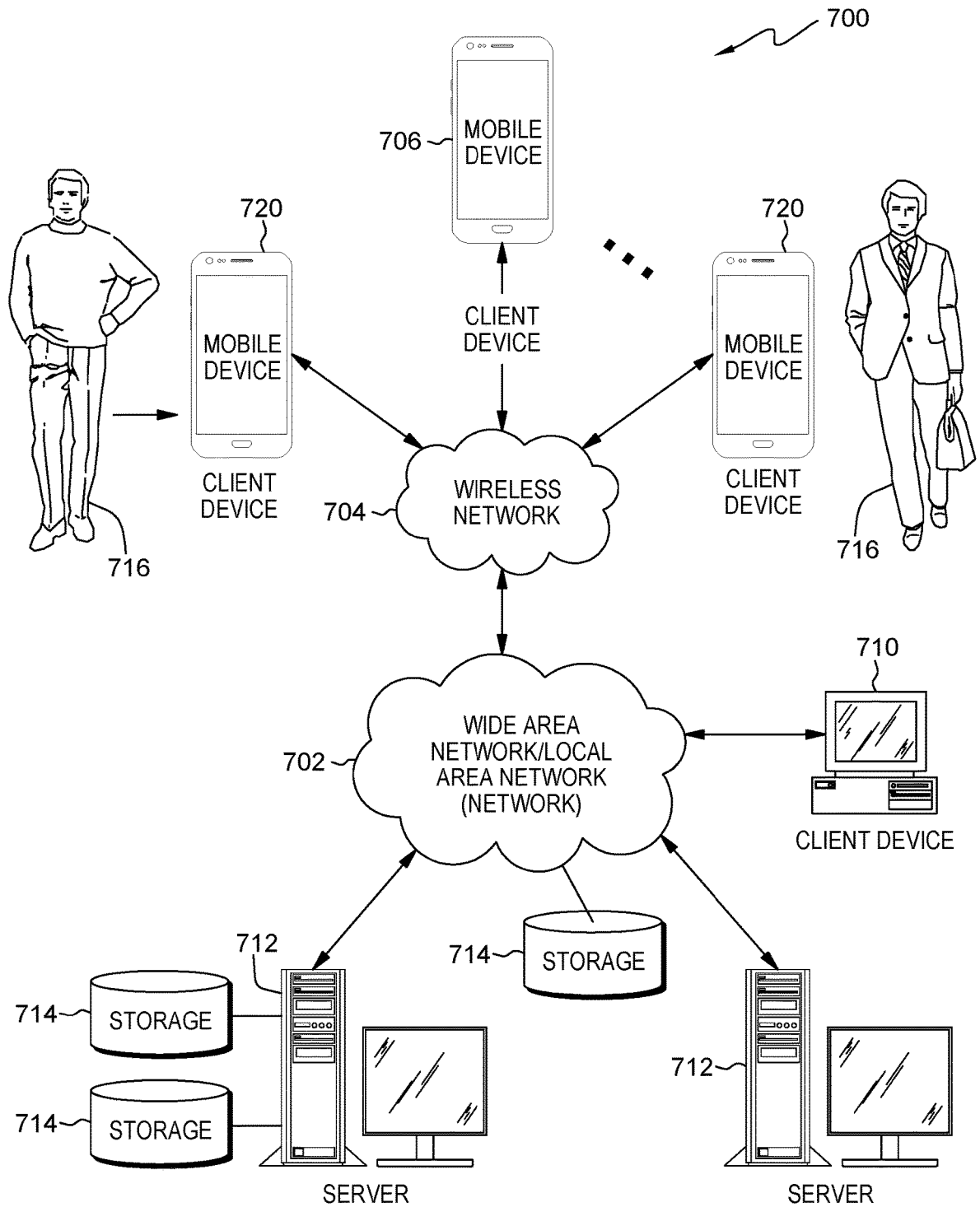
FIG. 7 shows a mobile processing environment in which embodiments of the invention may be practiced.

FIG. 7 shows components of a mobile computing environment 700 that may be used in embodiments of the invention. As shown, environment 700 of FIG. 7 includes local area networks ("LANs")/wide area network 702, wireless network 704, mobile devices 706, client device 710, servers 712, and data storage devices 714. FIG. 7 also shows customers 716, each of which has a mobile communications device 720.

Generally, mobile devices 706 and 720 may include virtually any portable computing device that is capable of receiving and sending a message over a network, such as networks 702 and wireless network 704. Such devices include portable devices such as cellular telephones and smart phones, and wearable devices such as smart watches, smart glasses and smart lenses. Mobile devices 706 and 720 may also include display pagers, radio frequency (RF) devices, infrared (IR) devices, Personal Digital Assistants (PDAs), handheld computers, laptop computers, wearable computers, tablet computers, integrated devices combining one or more of the preceding devices, and the like. As such, mobile devices 706 and 720 typically range widely in terms of capabilities and features.

Wireless network 704 is configured to couple mobile devices 706 and 720 and their components with network 702. Wireless network 704 may include any of a variety of wireless sub-networks that may further overlay stand-alone ad-hoc networks, and the like, to provide an infrastructure-oriented connection for mobile devices 706 and 720. Such sub-networks may include mesh networks, Wireless LAN (WLAN) networks, cellular networks, and the like.

Each mobile communications device 706, 720 may be connected to the network 704 in a manner that enables bi-directional communications. Thus, for example, one or all of the devices 706 and 720 may provide a signal to the network in order to provide a feedback or control signal to the servers 712. Likewise, the servers 712 may provide control signals to the network 704 in order to provide control signals to one or more of the mobile communications devices.

Client device 710 represents other suitable computing or processing devices that may be used in environment 700. For instance, the client device 710 may comprise a personal computer, laptop computer, handheld computer, tablet computer, or Personal Digital Assistant (PDA). Device 710 may also include cellular telephones, smart phones, wearable computers and the like.

The servers 712 are configured to receive inputs from the mobile communications devices 706 and 720. The servers may process the input received from the devices 706, 720, in the manner discussed above.

Servers 712 include virtually any device that may be configured to provide an application service in environment 700. Such application services or simply applications include, but are not limited to, email applications, search applications, video applications, audio applications, graphic applications, social networking applications, text message applications, or the like. In one embodiment, servers 712 may operate as web servers. However, servers 712 are not limited to web servers.

Storage devices 714 may comprise any suitable data storage devices, and the devices may be directly connected to one or more of the servers 712, or the storage devices may be accessed via network 702.

Network 702 is enabled to employ any form of computer readable media for communicating information from one electronic device to another. Also, network 702 can include the Internet in addition to local area networks (LANs), wide area networks (WANs), direct connections, such as through a universal serial bus (USB) port, other forms of computer-readable media, or any combination thereof.

A web-enabled mobile device used in or with environment 700 may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile devices used in or with environment 700 may each receive messages sent from servers 712, from one of the other mobile devices, or even from another computing device. Mobile devices 706, 720 may also send messages to one of servers 712, to other mobile devices, or to client device 710, or the like. Mobile devices 706, 720 may also communicate with non-mobile client devices, such as client device 710, or the like.

Those of ordinary skill in the art will appreciate that the architecture and hardware depicted in FIG. 7 may vary. Not all the illustrated components may be required to practice the invention, and variations in the arrangement and type of the components may be made without departing from the spirit or scope of the invention.

Figure 8:
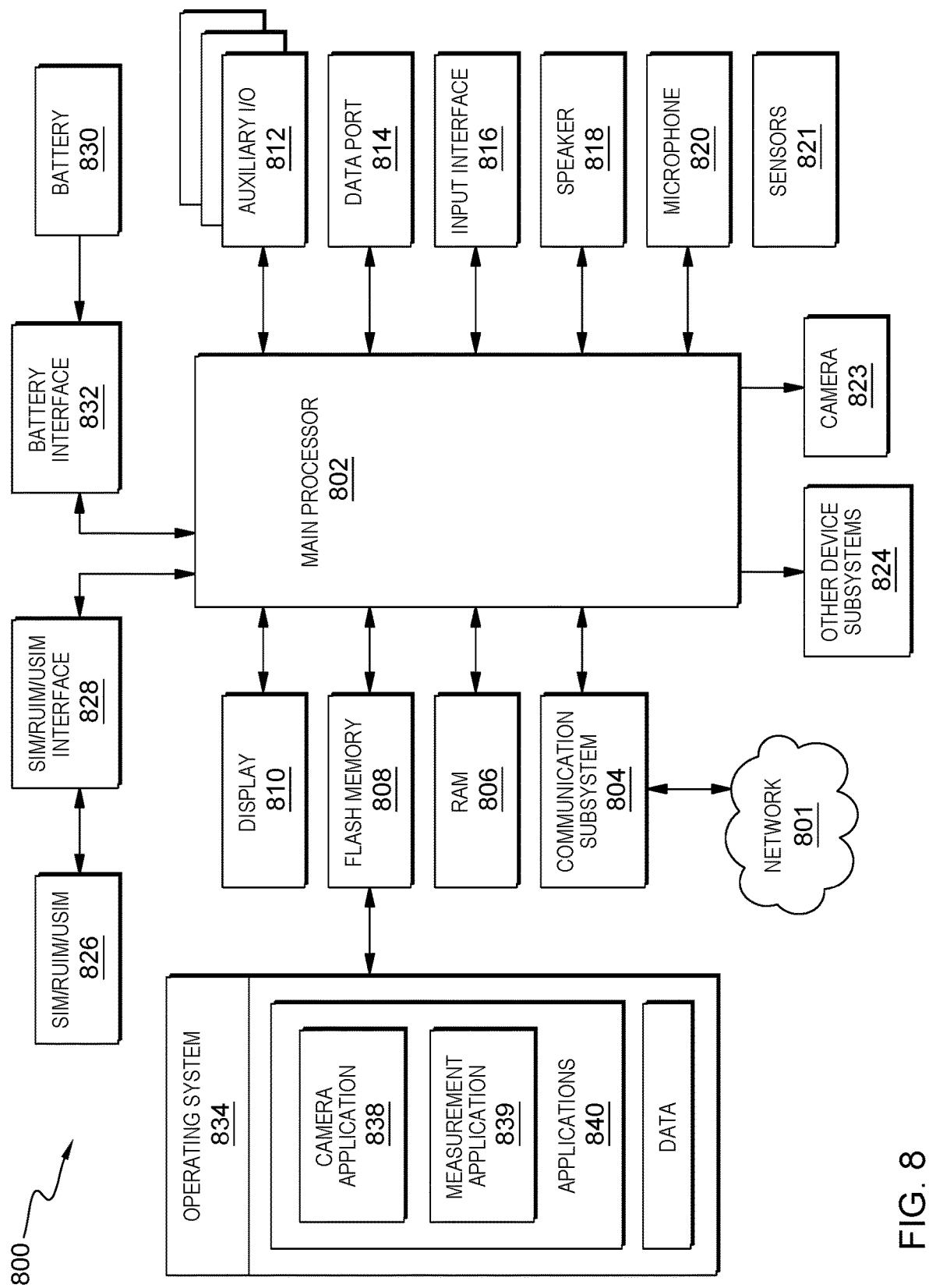
FIG. 8 illustrates in more detail one of the mobile devices of the processing environment of FIG. 7.

FIG. 8 illustrates in more detail an example mobile communication device 800, which can be used in embodiments of the invention. For example, device 800 may be used as mobile devices 706 or 720 of the mobile communications environment 700 of FIG. 7. Mobile communication device 800 can be any suitable type of mobile communication device that includes a camera. In the embodiment disclosed in FIG. 8, mobile communication device 800 is a wireless mobile telephone or tablet capable of operating in both wide-area cellular networks and in a variety of short-range networks, such as local area networks (LANs), WiFi, Bluetooth, etc. Mobile communication device 800 can also be a personal digital assistant (PDA), e-reader, or other mobile electronic device that contains a camera.

Mobile communication device 800 comprises a number of components including a main processor 802 that controls the overall operation of mobile communication device 800. Communication functions, which include data communications and can also include voice communications, are performed through communication subsystem 804. Communication subsystem 804 receives messages from and sends messages to a wireless network 801. In this example embodiment of mobile communication device 800, communication subsystem 804 is configured in accordance with the Global System for Mobile Communication (GSM) and General Packet Radio Services (GPRS) standards, which is used worldwide. Other communication configurations that are also applicable are the 3G and 4G networks such as EDGE, UMTS and HSDPA, LTE, Wi-Max etc.

New standards are still being defined, and persons skilled in the art will understand that the embodiments described herein are intended to use any other suitable standards that are developed in the future. The wireless link connecting communication subsystem 804 with wireless network 801 represents one or more different Radio Frequency (RF) channels, operating according to defined protocols specified for GSM/GPRS communications.

Main processor 802 also interacts with additional subsystems such as Random Access Memory (RAM) 806, flash memory 808, display 810, auxiliary input/output (I/O) subsystem 812, data port 814, input interface 816, speaker 818, microphone 820, camera 823, sensors 821, and other device subsystems 824. Sensors 821 can include an accelerometer, tilt sensor, proximity sensor, magnetometer, pressure sensor (none of which are specifically shown). The display 810 can be a touch-screen display able to receive inputs through a user's touch. Some of the subsystems of mobile communication device 800 perform communication-related functions, whereas other subsystems may provide resident or on-device functions. By way of example, display 810 and input interface 816 may be used for both communication-related functions, such as entering a text message for transmission over wireless network 801, and device-resident functions such as a calculator or task list.

Mobile communication device 800 can send and receive communication signals over wireless network 801 after required network registration or activation procedures have been completed. Network access is associated with a subscriber or user of mobile communication device 800. To identify a subscriber, mobile communication device 800 may use a subscriber module component or smart card 826, such as a Subscriber Identity Module (SIM), a Removable User Identity Module (RUIM) and a Universal Subscriber Identity Module (USIM). In the example shown, SIM/RUIM/USIM 826 is inserted into SIM/RUIM/USIM interface 828 in order to communicate with a network. Once SIM/RUIM/USIM 826 is inserted into SIM/RUIM/USIM interface 328, it is coupled to main processor 802.

Mobile communication device 800 is a battery-powered device and includes battery interface 832 for receiving one or more rechargeable batteries 830. In at least some embodiments, battery 830 can be a smart battery with an embedded microprocessor. Battery interface 832 is coupled to a regulator (not shown), which assists battery 830 in providing power to mobile communication device 800. Although current technology makes use of a battery, future technologies such as micro fuel cells may provide power to mobile communication device 800.

Figure 9:
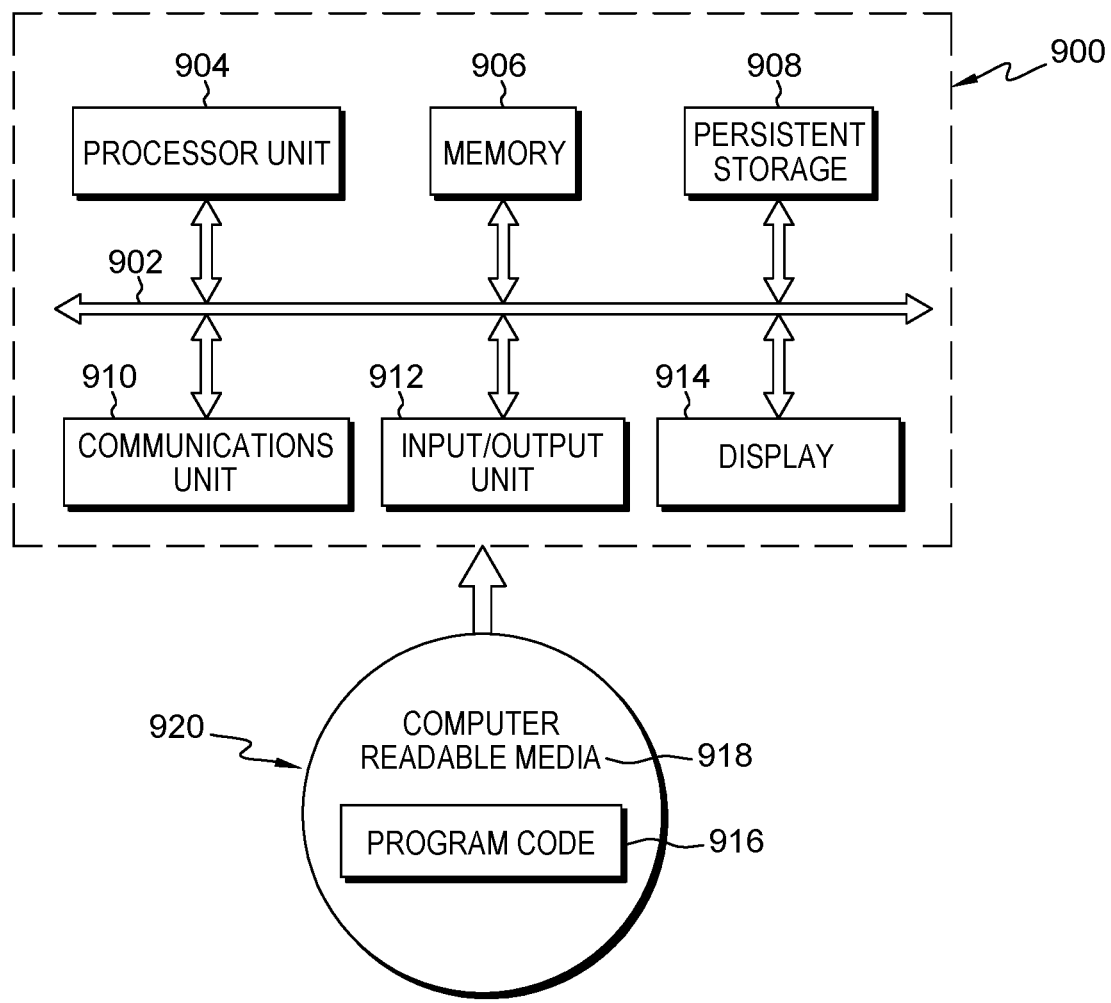
FIG. 9 depicts a processing unit that may be used in the processing environment of FIG. 7 or the mobile computing device of FIG. 8.

FIG. 9 depicts a diagram of a data processing system 900. Data processing system 900 is an example of a computer, such as, for example, servers 712 or clients 710 in FIG. 7. Processing system 900 may also be used in the mobile device 800 of FIG. 8. In this illustrative example, data processing system 900 includes communications fabric 902, which provides communications between processor unit 904, memory 906, persistent storage 908, communications unit 910, input/output (I/O) unit 212, and display 914.

Processor unit 904 serves to execute instructions for software that may be loaded into memory 906. Processor unit 904 may be a set of one or more processors or may be a multi-processor core, depending on the particular implementation. Further, processor unit 204 may be implemented using one or more heterogeneous processor systems, or, as another illustrative example, processor unit 904 may be a symmetric multi-processor system containing multiple processors of the same type.

Memory 906 and persistent storage 908 are examples of storage devices 916. Memory 906, in these examples, may be, for example, a random access memory, or any other suitable volatile or non-volatile storage device. Persistent storage 908 may take various forms, depending on the particular implementation. For example, persistent storage 908 may contain one or more components or devices. For example, persistent storage 208 may be a hard drive, a flash memory, a rewritable optical disk, a rewritable magnetic tape, or some combination of the above.

Communications unit 910, in these examples, provides for communication with other data processing systems or devices. In these examples, communications unit 910 is a network interface card. Communications unit 210 may provide communications through the use of either or both physical and wireless communications links.

Input/output unit 912 allows for the input and output of data with other devices that may be connected to data processing system 900. For example, input/output unit 912 may provide a connection for user input through a keyboard, a mouse, and/or some other suitable input device. Further, input/output unit 912 may send output to a printer. Display 914 provides a mechanism to display information to a user.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The description of the invention has been presented for purposes of illustration and description, and is not intended to be exhaustive or to limit the invention in the form disclosed. Many modifications and variations will be apparent to those of ordinary skill in the art without departing from the scope of the invention. The embodiments were chosen and described in order to explain the principles and applications of the invention, and to enable others of ordinary skill in the art to understand the invention. The invention may be implemented in various embodiments with various modifications as are suited to a particular contemplated use.

The invention claimed is:

1. A method of managing data in a computing network, comprising:
   obtaining specified data from a database in the computing network;
   aggregating the specified data in a defined data structure stored in the computing network; and
   specifying in the defined data structure properties over the data aggregated in the defined data structure to facilitate consistent use of the specified data by a plurality of different services;
   and wherein:
      the defined data structure includes a plurality of fields and the specified data are stored in the plurality of fields;
      different ones of the fields are annotated with different ones of the properties; and
      the properties include consistency constraints applied to sets of the fields.

2. The method according to claim 1, further comprising:
   a plurality of services in the computing network using the data in the defined data structure; and
   each of the plurality of services using the data in the defined data structure in accordance with the properties specified in the defined data structure.

3. The method according to claim 2, wherein one or more of the services modifies one or more of the properties specified in the defined data structure.

4. The method according to claim 3, wherein the one or more of the services modifies the one or more of the properties specified in the defined data structure based on a transformation by the one or more of the services of the data aggregated in the defined data structure.

5. The method according to claim 1, wherein the specifying in the defined data structure properties over the data aggregated in the defined data structure includes attaching the properties to the data aggregated in the defined data structure.

6. The method according to claim 1, wherein:
   the specified data include a multitude of data items; and
   the specifying in the defined data structure properties over the data aggregated in the defined data structure includes marking one or more of the data items as public, and marking one or more others of the data items as secret.

7. The method according to claim 1, wherein:
   the specified data include a multitude of data items; and
   the specifying in the defined data structure properties over the data aggregated in the defined data structure includes requiring a given correlation between a specified one of the data items and a specified another one of the data items.

8. The method according to claim 1, wherein the specifying in the defined data structure properties over the data aggregated in the defined data structure includes using a declarative language for aggregation and abstraction of the specified data as unified data structures with the properties and capabilities, the declarative language including encapsulation, subclassing, pre and post conditions, and modular design of specifications.

9. A system for managing data in a computing network, comprising:
a memory for storing data; and
one or more processing units operatively connected to the memory for receiving data from and transmitting data to the memory, the one or more processing units configured for:
obtaining specified data from a database in the computing network;
aggregating the specified data in a defined data structure, and storing the defined data structure in the computing network; and
specifying in the defined data structure properties over the data aggregated in the defined data structure to facilitate consistent use of the specified data by a plurality of different services;
and wherein:
the defined data structure includes a plurality of fields and the specified data are stored in the plurality of fields;
different ones of the fields are annotated with different ones of the properties; and
the properties include consistency constraints applied to sets of the fields.

10. The system according to claim 9, wherein the one or more processing units are further configured for:
performing a plurality of services using the data in the defined data structure, each of the plurality of services using the data in the defined data structure in accordance with the properties specified in the defined data structure.

11. The system according to claim 10, wherein one or more of the services modifies one or more of the properties specified in the defined data structure based on a transformation by the one or more of the services of the data aggregated in the defined data structure.

12. The system according to claim 9, wherein the specifying in the defined data structure properties over the data aggregated in the defined data structure includes attaching the properties to the data aggregated in the defined data structure.

13. A computer readable program storage device for managing data in a computing network, the computer readable program storage device comprising:
a non-transitory computer readable storage medium having program instructions embodied therein, the program instructions executable by a computer to cause the computer to perform the method of:
obtaining specified data from a database in the computing network;
aggregating the specified data in a defined data structure, and storing the defined data structure in the computing network; and
specifying in the defined data structure properties over the data aggregated in the defined data structure to facilitate consistent use of the specified data by a plurality of different services;
and wherein:
the defined data structure includes a plurality of fields and the specified data are stored in the plurality of fields;
different ones of the fields are annotated with different ones of the properties; and
the properties include consistency constraints applied to sets of the fields.

14. The computer readable program storage device according to claim 13, wherein a plurality of services in the computing network use the data in the defined data structure, and said method further comprises:
each of the plurality of services using the data in the defined data structure in accordance with the properties specified in the defined data structure.

15. The computer readable program storage device according to claim 14, wherein one or more of the services modifies one or more of the properties specified in the defined data structure based on a transformation by the one or more of the services of the data aggregated in the defined data structure.

16. The computer readable program storage device according to claim 13, wherein the specifying in the defined data structure properties over the data aggregated in the defined data structure includes attaching the properties to the data aggregated in the defined data structure.

* * * * *